United States Patent
Han et al.

(10) Patent No.: US 7,354,178 B2
(45) Date of Patent: Apr. 8, 2008

(54) STRUCTURE OF ILLUMINATING UNIT AND STRUCTURE OF ILLUMINATING LIGHT SOURCE

(75) Inventors: Wei-Kuo Han, Hsinchu (TW); Ra-Min Tain, Jhonghe (TW); Chin-Lung Chen, Hsinchu (TW); Shyi-Ching Liau, Jhudong Township, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 228 days.

(21) Appl. No.: 11/223,557

(22) Filed: Sep. 9, 2005

(65) Prior Publication Data

US 2007/0019412 A1   Jan. 25, 2007

(30) Foreign Application Priority Data

Jul. 25, 2005   (TW) .............................. 94125065 A (51) Int. Cl.
*F21V 7/00* (2006.01)

(52) U.S. Cl. ...................... 362/304; 362/241; 362/346; 362/800; 257/98; 313/500

(58) Field of Classification Search ................ 362/241, 362/296, 301, 302, 304, 346, 297, 800; 257/98
See application file for complete search history.

(56) References Cited

U.S. PATENT DOCUMENTS

| 1,726,379 | A | * | 8/1929 | Benford ...................... 362/297 |
| 4,254,453 | A | * | 3/1981 | Mouyard et al. ........... 362/241 |
| 4,907,044 | A | * | 3/1990 | Schellhorn et al. ......... 362/296 |
| 6,495,861 | B1 | * | 12/2002 | Ishinaga ...................... 257/99 |
| 6,547,400 | B1 | | 4/2003 | Yokoyama ................... 353/98 |
| 2002/0080622 | A1 | | 6/2002 | Pashley et al. ............. 362/555 |

FOREIGN PATENT DOCUMENTS

WO   WO 01/433113   6/2001

* cited by examiner

*Primary Examiner*—Stephen F. Husar
(74) *Attorney, Agent, or Firm*—J.C. Patents (57) ABSTRACT

A structure of illuminating unit includes a point-like light-emitting device, having an optical axis. An initial-stage conoid-like reflective surface has a convergent opening end and a divergent opening end. The point-like light-emitting device is located at the convergent opening end and the optical axis is toward the divergent end for emitting light. The initial-stage conoid-like reflective surface and the optical axis include an initial-stage included angle. A final-stage conoid-like reflective surface has a convergent opening end and a divergent opening end. The convergent opening end of the final-stage conoid-like reflective surface is coupled with the divergent opening end of the initial-stage conoid-like reflective surface. The final-stage conoid-like reflective surface and the optical axis include a final-stage included angle. The initial-stage included angle is larger than the final-stage included angle.

22 Claims, 8 Drawing Sheets

STRUCTURE OF ILLUMINATING UNIT AND STRUCTURE OF ILLUMINATING LIGHT SOURCE

CROSS-REFERENCE TO RELATED APPLICATION

This application claims the priority benefit of Taiwan application serial no.94125065, filed on Jul. 25, 2005.

BACKGROUND OF THE INVENTION

1. Field of Invention

The present invention relates to an illuminating technology. More particularly, the present invention relates to a structure of an illuminating unit and a structure of an illuminating light source.

2. Description of Related Art

The artificial light source is a product always widely needed in our daily life, and, for example, is used to illuminate an object or an environment without the sun light, and further the image can be projected onto a screen for viewing by people and so on. As the development of scientific technology, the illuminating technology has been accordingly developed.

For example, the light source applied in a projector is provided by a high-illumination light lamp, such as UHP, through a short arc by electric discharge. Then, the radiant lights are led into a parallel beam as the collimating light by a parabolic reflection cup. Then, two sets of lens array are used to fully mix the light, and then the mixed light is controlled by a light valve to project onto a large screen with sufficiently good image quality.

In addition, the light emitted from the emitting diode (LED) as the light source is distributed in full solid angle, and the intensity of emitted light is not uniform on each side, caused by the non-uniform distribution of the internal current density. Further, the surface of the electrode also blocks the light, and clearly causes a light-emitting device with non-uniform luminance. Furthermore, it is quite difficult to effectively lead the lights emitted in solid angle into a parallel beam as the collimating light. Therefore, it is a big challenge to have a light source with high illuminating power, collimating, and uniform light. In order to improve the illuminating condition, a conventional design is shown in FIG. 1.

Figure 1:
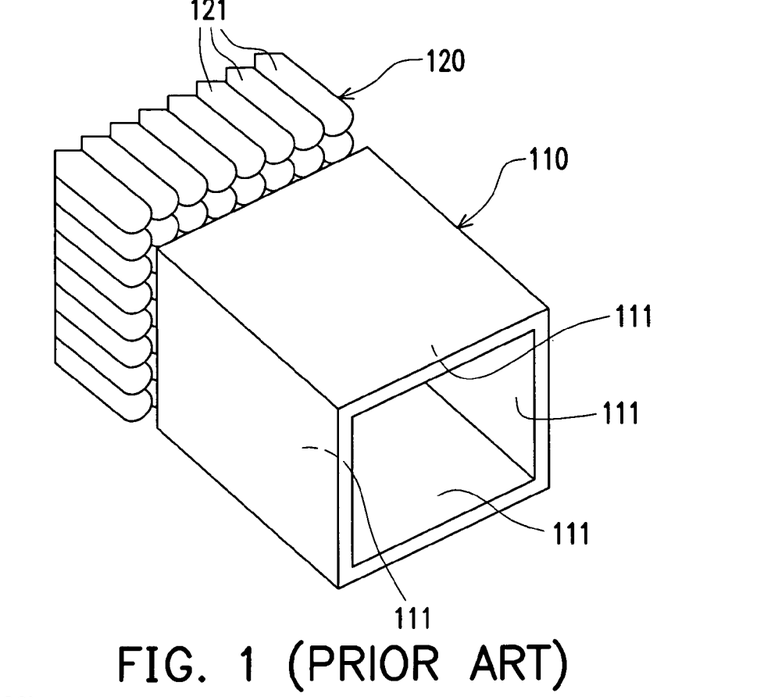
FIG. 1 is a drawing, schematically illustrating one conventional structure of a light source.

FIG. 1 is a drawing, schematically illustrating the conventional structure of a light source. This conventional structure uses several bullet-shape light lamps 121 in T1 specification with a diameter size of 3 mm or 5 mm, so as to form a rectangular array 120. At the light-emitting side, in order to mix each of the non-uniform light lamps, a reflection part 110 is implemented by composing four reflective surfaces 111 into a tube structure. By the reflection effect from the reflective surface 111, the non-uniform light can be mixed at a certain level. However, each of the light lamps has a non-uniform distribution of light intensity, symmetrical to a center axis. In addition, it has a gap region without light between the four adjacent light lamps 121. This would severely cause a dark region and then a non-uniform light source with interleave between bright region and dark region. In other words, even though the tube reflection structure is used, the mixing effect is still poor.

Figure 2:
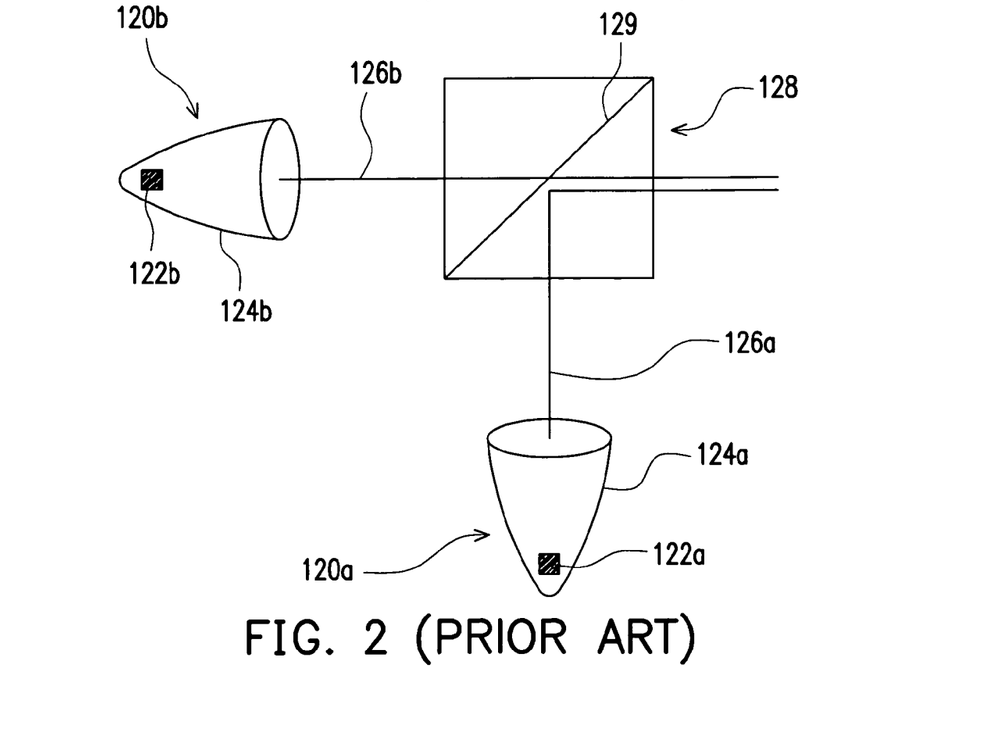
FIG. 2 is a drawing, schematically illustrating another conventional structure of a light source.

Another conventional design is shown in FIG. 2, in which the light sources 122a, 122b are composed of several LEDs being densely close, so as to obtain the larger light-flux by driving with high current. Further, the parabolic reflective surfaces 124a, 124b are used to lead the lights in all directions into collimating light in parallel direction. In this situation, the dense LEDs driven by high current would cause a high temperature, which further reduces the light-emitting efficiency. The lights from LEDs are not uniform, and the light source is still non-uniform after passing the axial symmetric reflection mirror for collimating the light.

The foregoing conventional designs still have the disadvantages, such as non-uniform light intensity or affecting quality of light source due to high temperature. Developments are continuously made by the manufacturers for designing a better light source.

SUMMARY OF THE INVENTION

The invention provides a structure of illuminating unit, which can effectively lead the divergent light into a collimating light, and can have light mixture by reflection, at the same time. As a result, the effect of collimating and uniform light can be achieved.

The invention provides a structure of illuminating light source, which uses several illuminating units to form an array, so as to achieve the performance of planar light source. The devices in illuminating units are not densely arranged together, so that the conventional high temperature can be reduced. In addition, the illuminating units can be put together in good match, so that the gap region without emitting light between the adjacent two illuminating units is reduced.

In an aspect of the present invention, a structure of illuminating unit includes a point-like light-emitting device, having an optical axis in emitting light. An initial-stage conoid-like reflective surface has a convergent opening end and a divergent opening end. The point-like light-emitting device is located at the convergent opening end and the optical axis is toward the divergent end for emitting light. The initial-stage conoid-like reflective surface and the optical axis include an initial-stage included angle. A final-stage conoid-like reflective surface has a convergent opening end and a divergent opening end. The convergent opening end of the final-stage conoid-like reflective surface is coupled with the divergent opening end of the initial-stage conoid-like reflective surface. The final-stage conoid-like reflective surface and the optical axis include a final-stage included angle. The initial-stage included angle is larger than the final-stage included angle.

In an embodiment of the foregoing structure of illuminating unit of the invention, the initial-stage conoid-like reflective surface and the final-stage conoid-like reflective surface are, for example, formed by several faces to have a multi-face pyramid-like surface. In addition, the pyramid-like surface is, for example, a square pyramid surface or a rectangular pyramid surface.

In an embodiment of the foregoing structure of illuminating unit of the invention, the initial-stage conoid-like reflective surface and the final-stage conoid-like reflective surface are, for example, cone-like surface.

In an embodiment of the foregoing structure of illuminating unit of the invention, it further includes at least one middle-stage conoid-like reflective surface, having a divergent opening end and a convergent opening end, so as to be coupled between the divergent opening end of the initial-stage conoid-like reflective surface and the convergent opening end of the final-stage conoid-like reflective surface. Wherein, the middle-stage conoid-like reflective surface and the optical axis include a middle-stage included angle, which is between the initial-stage included angle and the final-stage included angle.

In another aspect of the invention, a structure of illuminating light source includes multiple foregoing illuminating units to form a light-emitting array; and a circuit structure, coupled to the light-emitting array to drive the illuminating units for emitting light.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

In general consideration on the issues for the conventional illuminating light source, the present invention proposes a novel design, so as to increase the illumination quality. The illumination light source of the present invention is formed from multiple illuminating units, which are arranged in an array. The illuminating units can be densely connected together to form the intended light-emitting plane. However, the light-emitting device of the illuminating unit is put together without being closely adjacent, so that it can effectively avoid excessively-high temperature, and therefore affecting the light-emitting efficiency. Some embodiments are provided for describing the features of the present invention, but the present invention is not just limited to the embodiment.

Figure 3:
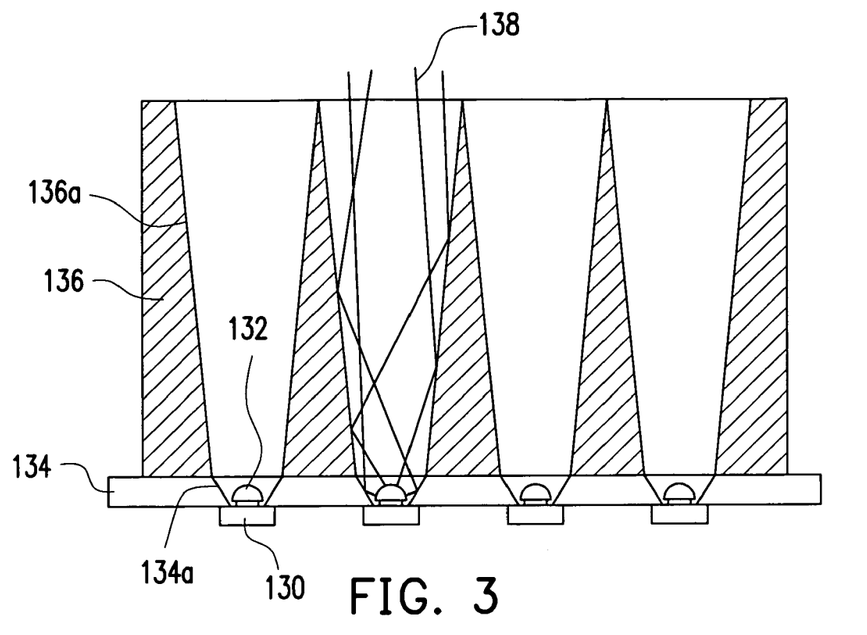
FIG. 3 is a cross-sectional view, schematically illustrating a structure of an illuminating light source, according to an embodiment of the present invention.
Figure 4:
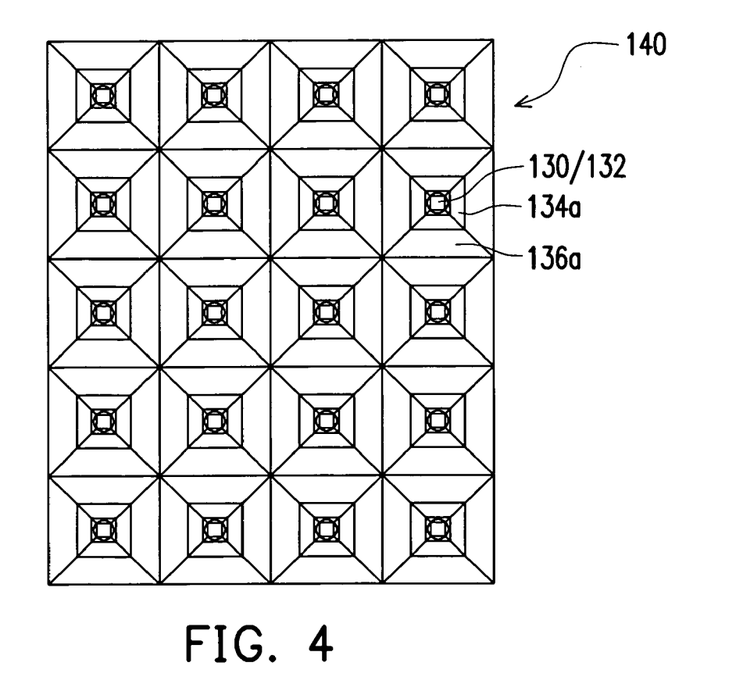
FIG. 4 is a top view, schematically illustrating a top view of the structure of the light source corresponding to FIG. 3.

FIG. 3 is a cross-sectional view, schematically illustrating a structure of an illuminating light source, according to an embodiment of the present invention. FIG. 4 is a top view, schematically illustrating a top view of the structure of the light source corresponding to FIG. 3. In FIG. 3 and FIG. 4, the array of the illuminating light source can include, for example, four illuminating units in one side. An illuminating unit includes a point-like light-emitting device, such as LED having a substrate electrode part 130 and a packaged emitting part 132. The point-like light-emitting device radiantly emits lights in a range of a solid angle based on a center point. For the point-like light-emitting device, the main emitting direction is defined as the optical axis 150 (see FIG. 5). At the periphery of the point-like light-emitting device, according to embodiment in FIG. 3 and FIG. 4, for example, the reflective surfaces 134a and 136a in two stages are implemented. By the arrangement of the angles for the reflective surfaces 134a and 136a in two stages, a large portion of the light emitted from the point-like light-emitting device would travel, for example, on the optical path 138, and be reflected by the reflective surfaces 134a and 136a for one time or multiple times. As a result, most of the light are led as a collimating light beam along the optical axis. At the same time, the light is well mixed due to the reflection of one time or multiple times.

For the two stages of the conoid-like reflective surfaces 134a and 136a, each stage can be, for example, a four-plane pyramid-like with a convergent opening end and a divergent opening end. It should be noted that, the term of "conoid-like" is a general term, indicating a surrounding slant surface, which has a convergent opening end and a divergent end. The shape of the convergent opening end and the divergent opening end can be circular, polygon, or other proper geometric shape. The point-like light-emitting device is located at the convergent opening end and the optical axis is toward the divergent end for emitting light. In general, the conoid-like surface can be formed by several planes to form the pyramid-like surface. Preferably in example, the shape at the horizontal cross-sectional view is a square shape or a rectangular shape, so as to have better matching effect. In addition, the triangular shape or a mixed from polygons in multiple sides can also be used. However, for the consideration of the good match in shape, the cross-sectional shape for the conoid-like reflective surface can also be circular, elliptical or smooth curve for forming the structure in conoid-like surface. Some examples in modification are to be described later.

The present invention can use the square LED chips to design multiple conoid-like reflective surface, such as reflection mirror. The present invention can gradually collimate the light as a collimating light by multiple times of reflection, but also the light can be well mixed to improve light uniformity. In addition, a gap between the adjacent two light-emitting openings can be significantly reduced to zero. As a result, a light source array with good match between adjacent units can be achieved, and thereby the light source with improvements of high density, collimating and uniformity can be provided. It is suitable for use as the light source with highly-confined direction, such as the light source in a projector, a scanner, a show-stage light, a search light, and so on, with small volume, small weight, and no risk in high temperature.

The implementation for the reflective surfaces 134a, 136a in FIG. 4 can be achieved by several different manners. However, in order to effectively and firmly implement multiple point-like light-emitting devices into the intended planar light source, preferably, the reflective surfaces 134a, 136a are respectively formed by two material layers 134, 136. The openings for the conoid-like reflective surfaces 134a, 136a can be formed at the predetermined positions on the material layers 134, 136. The light-emitting devices can be firmly implemented on the material layer 134, and emit the light via the openings. In addition, the second-stage material layer 136 is formed on the first-stage material layer 134, and the openings in the up stage and the lower stage are coupled to each other. In this design, the light-emitting devices in different light-emitting units are not assembled in a closely adjacent manner. However, if it is necessary, the number of the light-emitting devices in one unit can be multiple.

Remarkably, if the pyramid-like reflective surface is taken for design, since its shape is regular and can be well matched, the periphery of the divergent opening end of the conoid-like reflective surfaces 136a for the second (or final) stage can be well matched between adjacent units. In this manner, the conventional gap region between adjacent four cylindrical lamps 121, at which no light is emitted, can be further reduced. This design of the present invention with good match on the periphery between the adjacent units is also another one of the essential features having been achieved.

Figure 5:
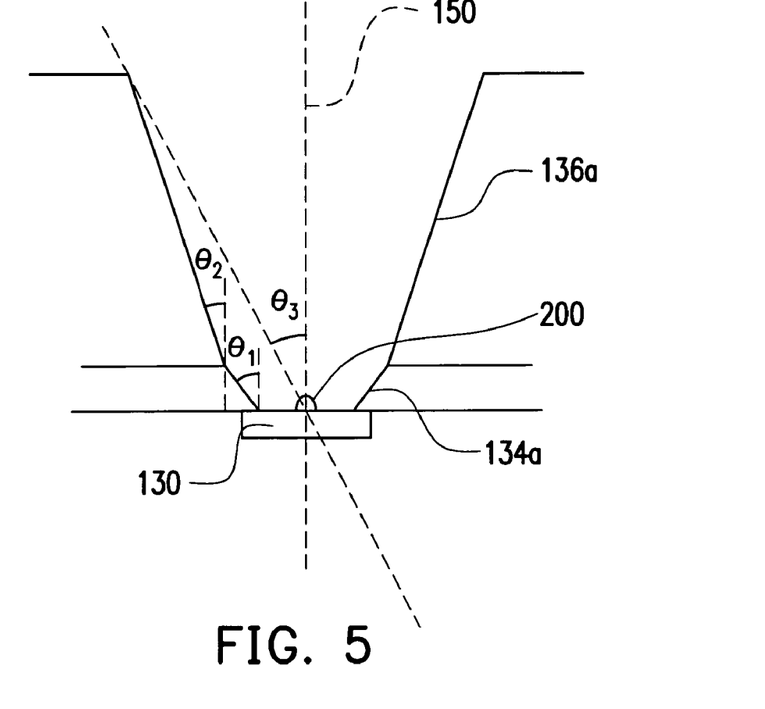
FIG. 5 is a cross-sectional view, schematically illustrating a structure of an illuminating unit, according to an embodiment of the present invention.

In the following descriptions, the design condition for the conoid-like surface in two stages is provided as the example. FIG. 5 is a cross-sectional view, schematically illustrating a structure of an illuminating unit, according to an embodiment of the present invention. The optical axis for the point-like light-emitting device is shown by the dashed line 150. In addition, the various designing angles described in the invention are defined to be an angle from the optical axis 150. As a result, an included angle $\theta_1$ is defined to be between the first-stage (or initial-stage) conoid-like surface 134a and the optical axis 150. An included angle $\theta_2$ is defined to be between the second-stage (or final-stage) conoid-like surface 136a and the optical axis 150. The included angle $\theta_1$ is larger than the included angle $\theta_2$. Basically, the included angle $\theta_1$ is, for example, in a range of 30-40 degrees, and the included angle $\theta_2$ is, for example, in a range of 4-7 degrees. For the actual design, the angles $\theta_1$ and $\theta_2$ are considered in accordance with the thickness of material layers 134, 136. Preferably, the thickness of the material layer 134 is smaller than the thickness of the material layer 136. In addition, the included angle $\theta_3$ is defined to be between the outer periphery and the optical axis 150. If the outer periphery is not circular, the included angle $\theta_3$ between the outer periphery and the optical axis 150 changes with the position of the outer periphery. For easy definition and design, the included angle $\theta_3$ can take from the maximum included angle or the minimum included angle. Since the light intensity of the light-emitting device, as varying with the emitting angle, has a large portion within a certain angle, for example, taking the angle width at half height of the light intensity distribution versus angle. In other words, the quantity of $\theta_3$ can be set according to the actual design on requirement of collimating level for the light. Therefore, the quantity of $\theta_3$ is set in a range, such as 8-16 degrees. Due to the geometric relation and the requirement for conformal coupling between adjacent stages, when the angles $\theta_1$, $\theta_2$, and $\theta_3$ are set, the thickness for each material layer along the optical axis can be determined at the same time.

Figure 6:
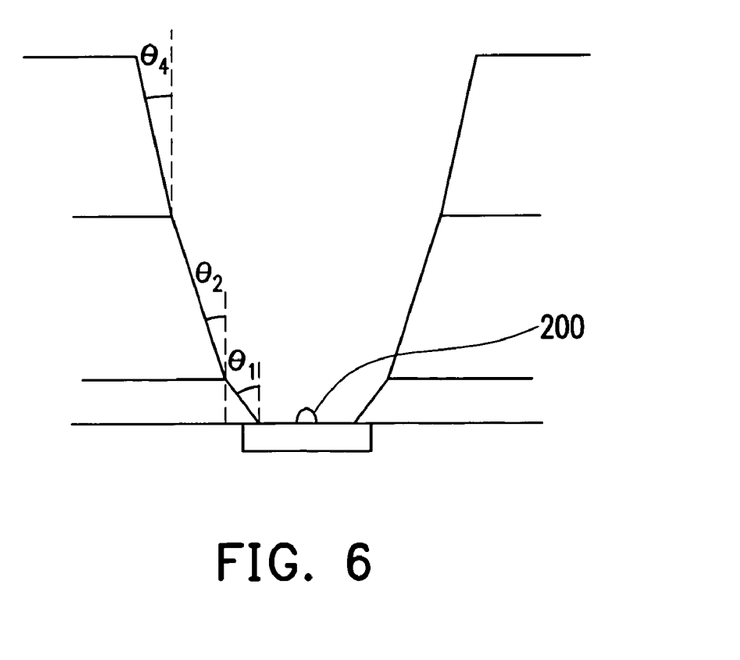
FIG. 6 is a cross-sectional view, schematically illustrating a structure of an illuminating unit, according to another embodiment of the present invention.

Further, FIG. 5 includes two stages for the conoid-like reflective surfaces as the example for descriptions. However, the actual number of the stages is not limited to two. The design principle of the conoid-like reflective surfaces is also suitable for use in more than two stages. From the low stage to the high stage, the angles are decreasing. FIG. 6 is an example for description by taking three stages. In this manner, the third stage is added on the second stage. In this situation, the third stage is also referred as the final stage, which has the included angle $\theta_4$, defined from the included angle with the optical axis 150. However, the angle $\theta_3$ is with respect to the final stage, otherwise, the consideration principle is the same. In addition, the angles $\theta_1$, $\theta_2$, and $\theta_4$ should satisfy the foregoing decreasing relationship, that is, $\theta_1 > \theta_2 > \theta_4$. Since the conformal coupling is required between the stages, the angles also determine the thickness for each layer along the optical axis.

Figure 7:
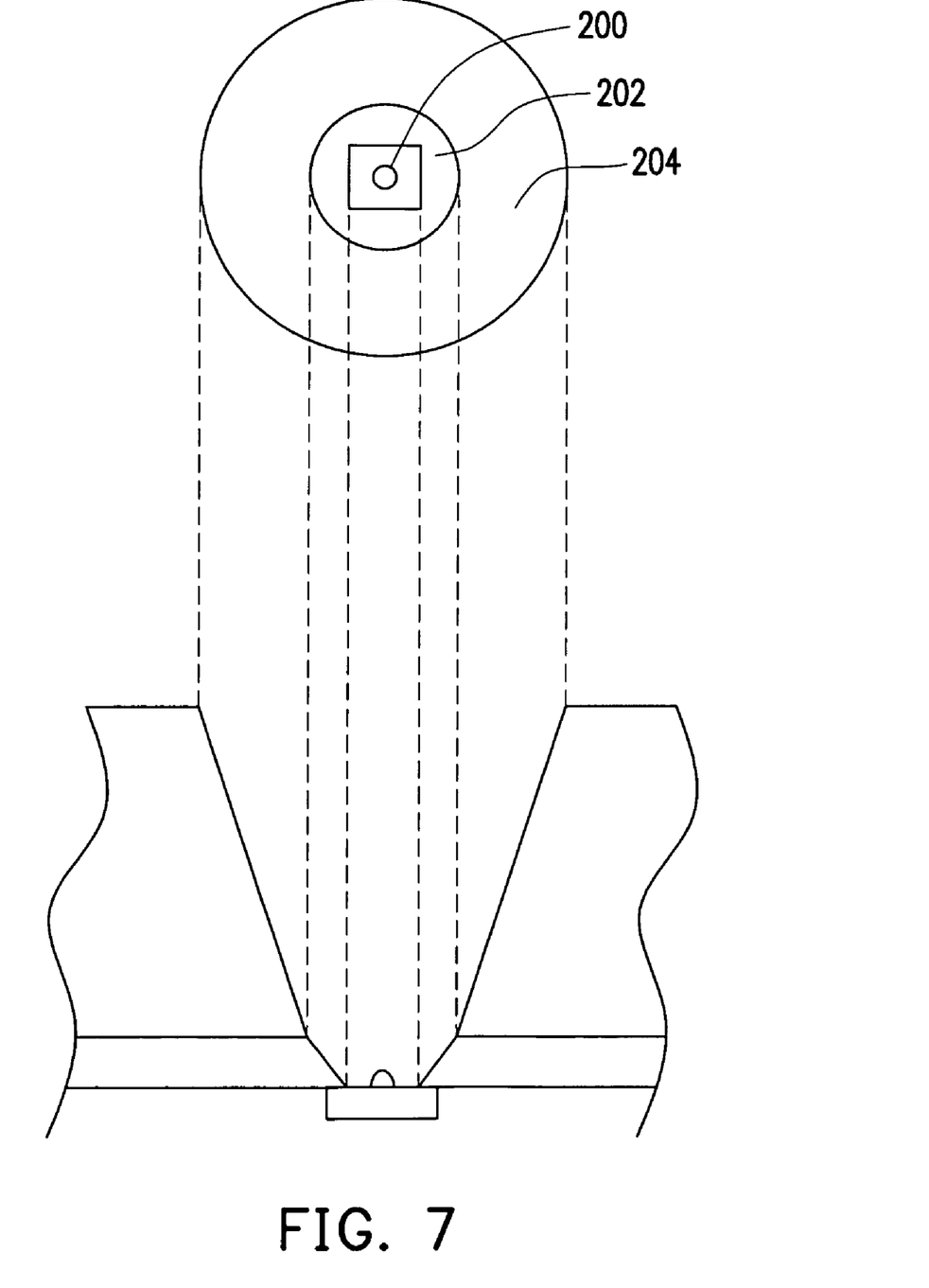
FIG. 7 is a cross-sectional view, schematically illustrating a structure of an illuminating unit, according to further another embodiment of the present invention.

As described above, the shape on the horizontal cross-sectional plane of conoid-like reflective surface can be square or rectangular, or even the other different shape. FIG. 7 is an embodiment with cone reflective surface. The light-emitting device 200 is located below the convergent opening end. It is formed from two cone reflective surfaces 202 and 204. The matching level for the design in cone reflective surfaces may be not as good as the matching level for the structure in FIG. 4, it is not necessary for the light-emitting devices to be closely adjacent. The separated light-emitting devices can at least prevent the high temperature from occurring.

Figure 8:
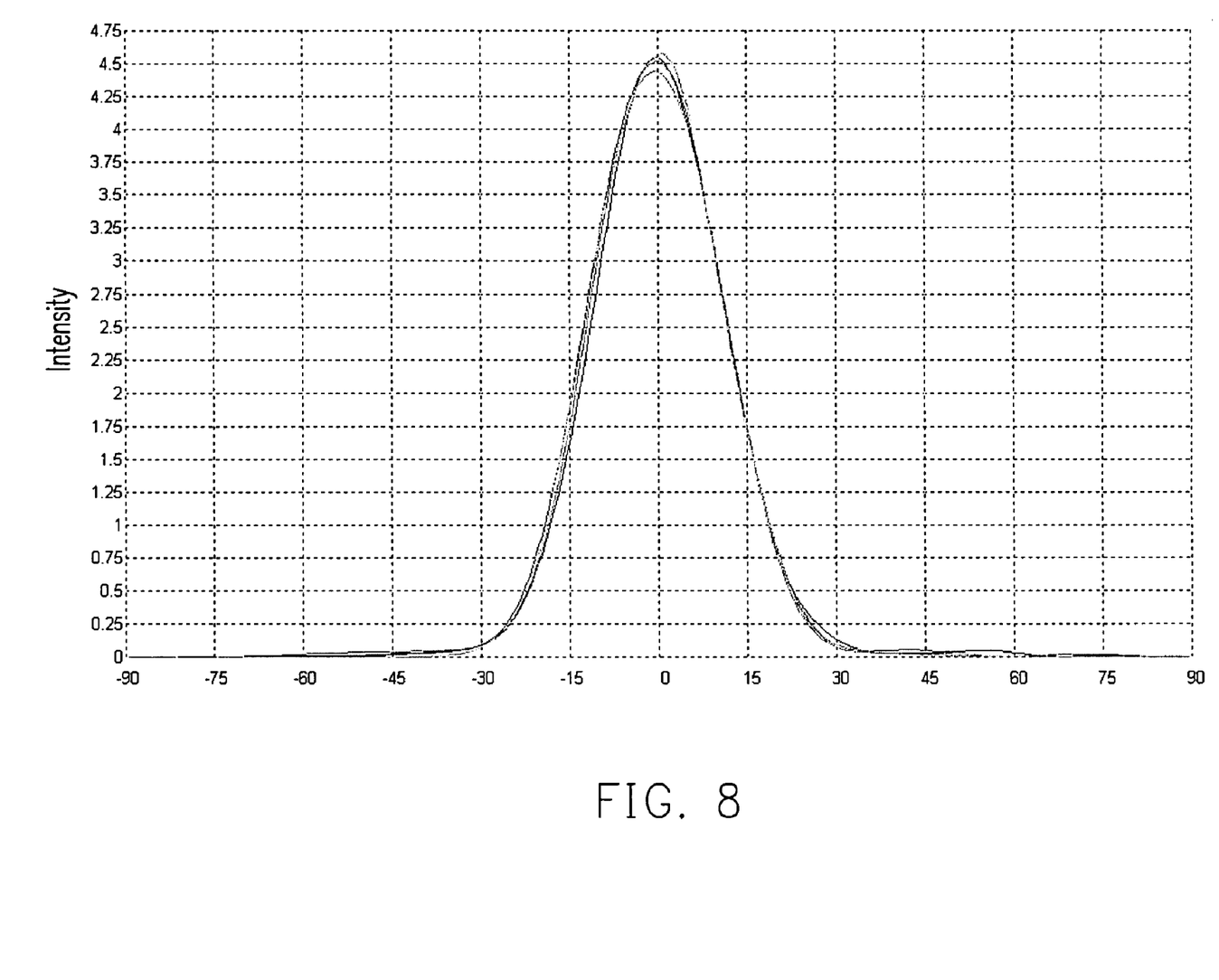
FIG. 8 is a drawing, schematically illustrating a distribution of the simulated light intensity as varying with the light-emitting angle, according to the design in FIG. 4.
Figure 9:
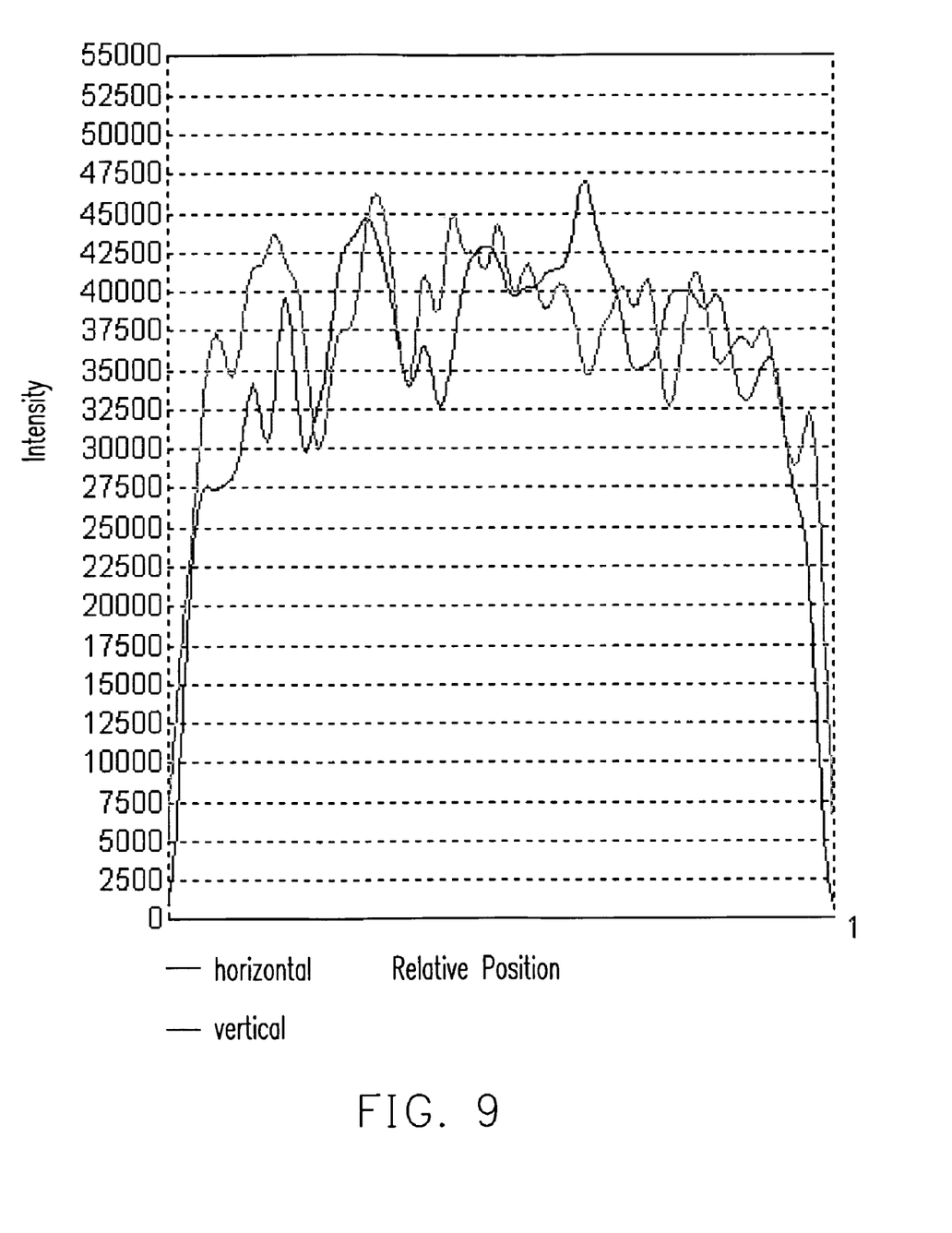
FIG. 9 is a drawing, schematically illustrating a distribution of the simulated light intensity as varying with the position, according to the design in FIG. 4.

FIG. 8 is a drawing, schematically illustrating a distribution of the measured light intensity as varying with the light-emitting angle, according to the design in FIG. 4. In FIG. 8, for the design in square shape, the three curves include the measurements in emitting angles along the directions in X-axis, Y-axis, and 45-degree diagonal. The light intensity versus the angle counting from the optical axis in the three directions is basically the same in distribution, and the width at the half height is about 15 degrees. This indicates that the collimating effect and the uniformity are sufficiently good. FIG. 9 is a drawing, schematically illustrating a distribution of the measured light intensity as varying with the position, according to the design in FIG. 4. In FIG. 9, the thick line represents the light intensity distribution along the horizontal axis, the thin line represents the light intensity distribution along the vertical axis. The result indicates that the design according to the present invention can have the uniformity in positions so that the sufficient uniformity can be achieved.

Figure 10:
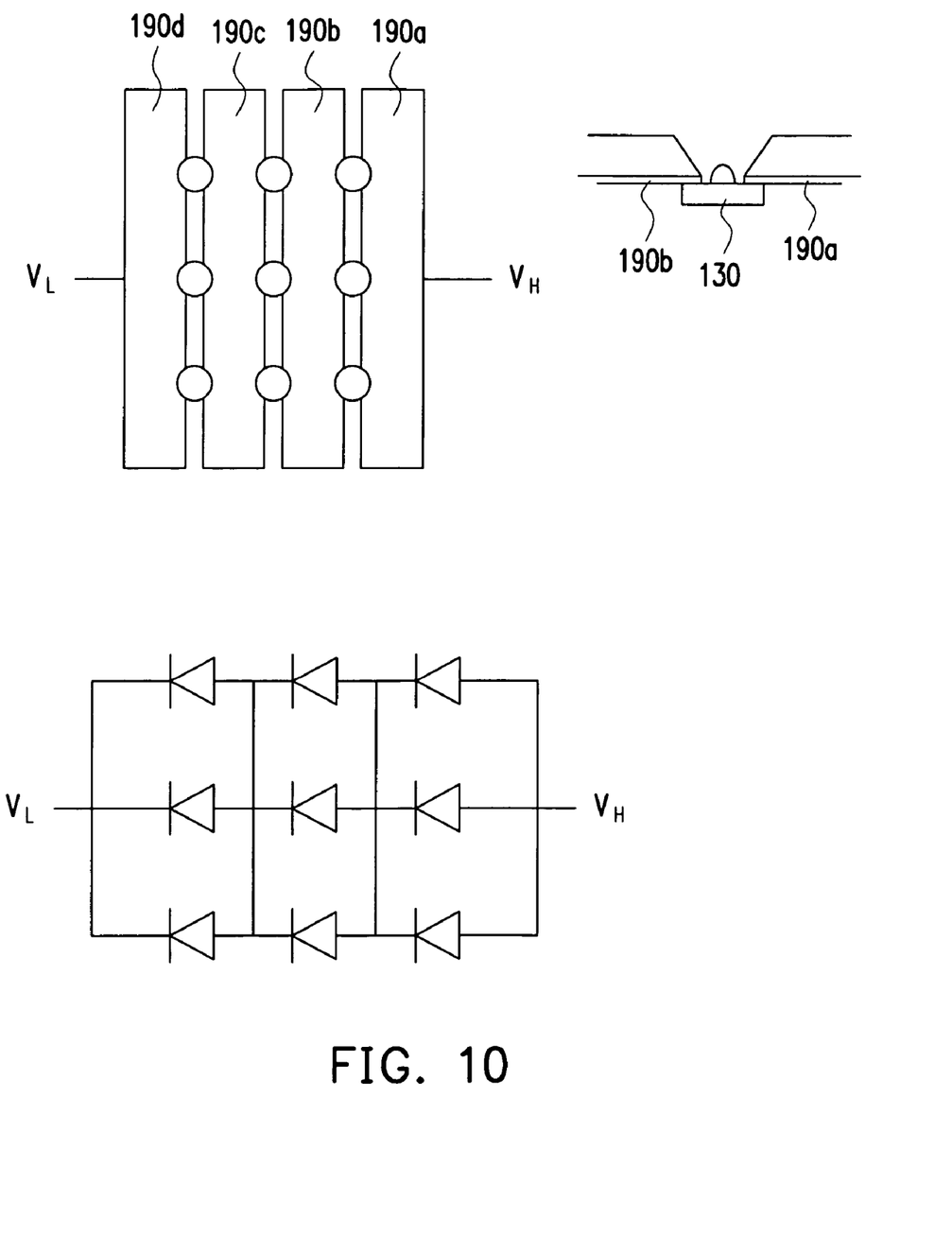
FIG. 10 is a drawing, schematically illustrating a circuit layout, according to an embodiment of the present invention.

Further, the present invention can use several illuminating units to form an illuminating light source. Taking LED as the example, it needs to be driven by applying a bias. In other words, each LED in the array is necessary to be applied with the bias. From the circuit design point of view, since the LED only needs the two electrodes in positive and negative electrodes, it can have several circuit layouts. FIG. 10 is a drawing, schematically illustrating a circuit layout, according to an embodiment of the present invention. In FIG. 10, taking an array for 3 by 3 as the example, the electrode structure includes, for example, several electrode plates 190a-190d connected in series. The LED's, indicated by circles, are connected between the adjacent two electrode plates. An external higher voltage $V_H$ is applied to the electrode plate 190a. A lower voltage $V_L$, such as a ground voltage, is connected to the electrode plate 190d. The equivalent circuit is shown at the bottom drawing, with several LED's being coupled in series. For the actual structure, such as the right drawing in FIG. 10, the electrode plate 190a and 190b are disposed on the material layer, and coupled with the substrate electrode part 130. FIG. 10 just shows an option of circuit layout, but is not the only choice. The ordinary skilled artisans can design the circuit according to the actual need.

Figure 11A:
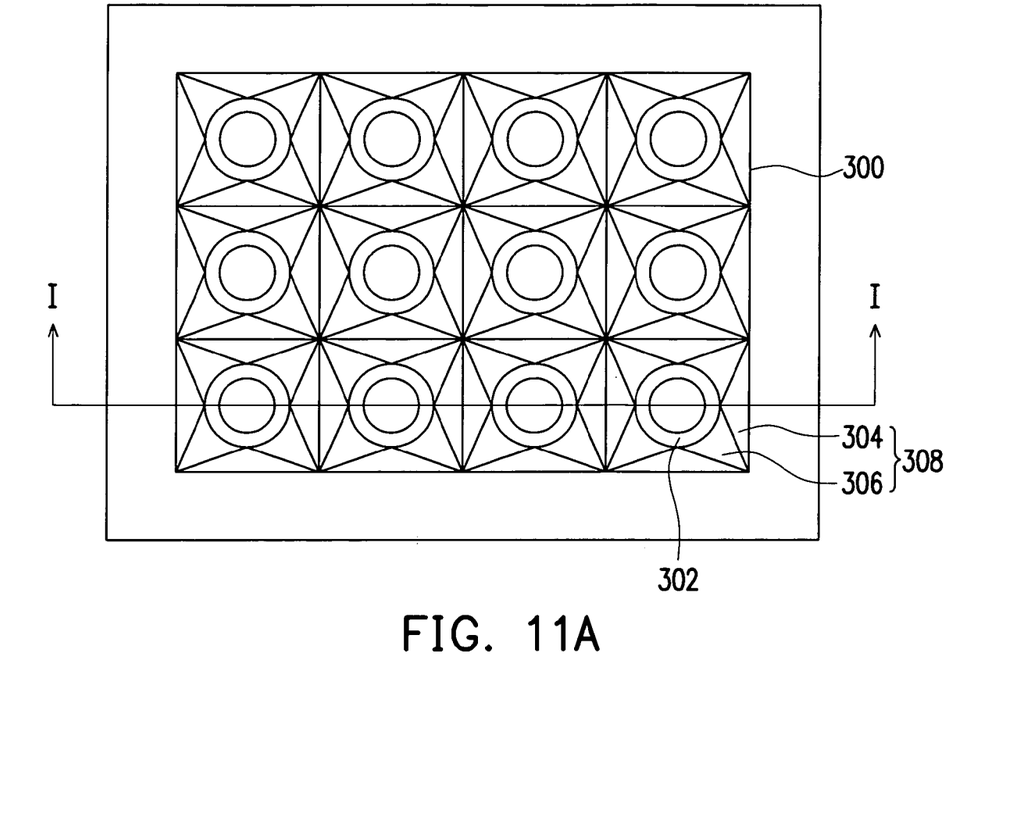
FIG. 11A is a top view, schematically illustrating another embodiment of the present invention.
Figure 11B:
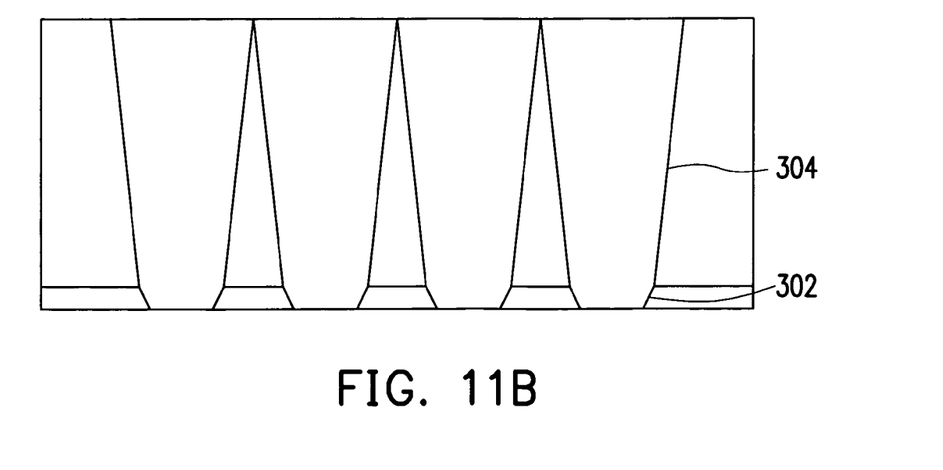
FIG. 11B is a cross-sectional view along the line I-I in FIG. 11A.

Further, when considering the cone shape design in FIG. 7, in order to avoid the gap region without emitting light existing between the adjacent two units, the upper conoid-like reflective surface can take a design of mixed conoid-like surface, such as the structure as shown in FIGS. 1A-1B. The convergent opening end of the final-stage conoid-like reflective surface 308 and the divergent opening end of the initial-stage conoid-like reflective surface 302 are coupled in a circular shape. However, the divergent opening end of the final-stage conoid-like reflective surface 308 can be a regular quadrilateral shape, such as square or rectangular. In the embodiment, the square is taken as the example. In FIG. 1A, since the divergent opening end and the convergent opening end of the final-stage conoid-like reflective surface 308 are not in the same shape, it is mixed from the conoid plane 304 and the conoid curving surface 306. The plane 304 of the final-stage conoid-like reflective surface 308 preferably is formed from four pyramid planes 304 (in triangular plane), wherein each of the pyramid planes 304 is, for example, a portion of the pyramid surface in FIG. 3. In addition, the curving surface 306 of the final-stage conoid-like reflective surface 308 is a smooth curving surface, which is formed by connecting each of the four corners as the common point to a periphery of the divergent opening end of the initial-stage conoid-like reflective surface 302. FIG. 11B is a cross-sectional view along the line I-I in FIG. 11A. The relation for the design angles still remains, as shown in FIG. 5. In addition, the present invention is not limited to the design in FIG. 11A. With the same design principle, it can also be designed that the convergent opening end and the divergent opening end of the final-stage conoid-like reflective surface are regular quadrilateral shape, such as square or rectangular. Then, the divergent opening end of the initial-stage conoid-like reflective surface is also the regular quadrilateral shape, being coupled with the convergent opening end of the final-stage conoid-like reflective surface. The convergent opening end of the initial-stage conoid-like reflective surface can be, for example, circular.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A structure of illuminating unit, comprises:
   a point-like light-emitting device, having an optical axis;
   an initial-stage conoid-like reflective surface, having a convergent opening end and a divergent opening end, wherein the point-like light-emitting device is located at the convergent opening end and the optical axis is toward the divergent end for emitting light, the initial-stage conoid-like reflective surface and the optical axis include an initial-stage included angle; and
   a final-stage conoid-like reflective surface, having a convergent opening end and a divergent opening end, wherein the convergent opening end of the final-stage conoid-like reflective surface is coupled with the divergent opening end of the initial-stage conoid-like reflective surface, the final-stage conoid-like reflective surface and the optical axis include a final-stage included angle, wherein the initial-stage included angle is larger than the final-stage included angle,
   wherein the divergent opening end of the initial-stage conoid-like reflective surface in a circular shape is coupled with the convergent opening end of the final-stage conoid-like reflective surface, and the final-stage conoid-like reflective surface has the convergent opening end in the circular shape and the divergent opening end in a regular quadrilateral shape to form a mixed conoid-like surface.

2. The structure of illuminating unit of claim 1, wherein the initial-stage conoid-like reflective surface and the final-stage conoid-like reflective surface includes a plurality of surfaces to form a pyramid surface.

3. The structure of illuminating unit of claim 2, wherein the pyramid surface includes a square pyramid surface or a rectangular pyramid surface.

4. The structure of illuminating unit of claim 1, further comprising at least one middle-stage conoid-like reflective surface, having a divergent opening end and a convergent opening end for coupling between the divergent opening end of the initial-stage conoid-like reflective surface and the convergent opening end of the final-stage conoid-like reflective surface, wherein the middle-stage conoid-like reflective surface and the optical axis include a middle-stage included angle, in quantity, between the initial-stage included angle and the final-stage included angle.

5. The structure of illuminating unit of claim 1, wherein an extending length of the initial-stage conoid-like reflective surface along a direction of the optical axis is smaller than an extending length of the final-stage conoid-like reflective surface along the direction of the optical axis.

6. The structure of illuminating unit of claim 1, wherein a line is formed from any point on a periphery of the divergent opening end of the final-stage conoid-like reflective surface to the point-like light-emitting device, wherein the line and the optical axis form a maximum included angle or a minimum included angle, being a predetermined angle, so as to determine a size of the divergent opening end of the final-stage conoid-like reflective surface.

7. The structure of illuminating unit of claim 1, wherein the initial-stage conoid-like reflective surface and the final-stage conoid-like reflective surface are respectively formed in an initial-stage material layer and a final-stage material layer.

8. The structure of illuminating unit of claim 1, wherein the point-like light-emitting device includes a light-emitting diode.

9. A structure of illuminating unit, comprises:
   a point-like light-emitting device, having an optical axis:
   an initial-stage conoid-like reflective surface, having a convergent opening end and a divergent opening end, wherein the point-like light-emitting device is located at the convergent opening end and the optical axis is toward the divergent end for emitting light, the initial-stage conoid-like reflective surface and the optical axis include an initial-stage included angle; and
   a final-stage conoid-like reflective surface, having a convergent opening end and a divergent opening end, wherein the convergent opening end of the final-stage conoid-like reflective surface is coupled with the divergent opening end of the initial-stage conoid-like reflective surface, the final-stage conoid-like reflective surface and the optical axis include a final-stage included angel, wherein the initial-stage included angle is larger than the final-stage included angle,
   wherein the divergent opening end of the initial-stage conoid-like reflective surface in a regular quadrilateral shape is coupled with the convergent opening end of the final-stage conoid-like reflective surface, and the final-stage conoid-like reflective surface has the divergent opening end in the regular quadrilateral shape, and the initial-stage conoid-like reflective surface has the convergent opening end in a circular shape and the divergent opening end in the regular quadrilateral shape to form a mixed conoid-like surface.

10. A structure of illuminating unit, comprises:
    a point-like light-emitting device, having an optical axis;

an initial-stage conoid-like reflective surface, having a convergent opening end and a divergent opening end, wherein the point-like light-emitting device is located at the convergent opening end and the optical axis is toward the divergent end for emitting light, the initial-stage conoid-like reflective surface and the optical axis include an initial-stage included angle; and a final-stage conoid-like reflective surface, having a convergent opening end and a divergent opening end, wherein the convergent opening end of the final-stage conoid-like reflective surface is coupled with the divergent opening end of the initial-stage conoid-like reflective surface, the final-stage conoid-like reflective surface and the optical axis include a final-stage included angle, wherein the initial-stage included angle is larger than the final-stage included angle, wherein a line is formed from any point on a periphery of the divergent opening end of the final-stage conoid-like reflective surface to the point-like light-emitting device, wherein the line and the optical axis form a maximum included angel or a minimum included angle, being a predetemined angle, so as to determine a size of the divergent opening end of the final-stage conoid-like reflective surface, wherein the predetermined angle is in a range of 8-16 degrees.

11. The structure of illuminating unit of claim 10, wherein the initial-stage included angle for the initial-stage conoid-like reflective surface is in a range of 30-40 degrees.

12. The structure of illuminating unit of claim 10, wherein the final-stage included angle for the final-stage conoid-like reflective surface is in a range of 4-7 degrees.

13. A structure of illuminating light source, comprising:
a plurality of the illuminating units to form a light-emitting array; and
a circuit structure, coupled to the light-emitting array to drive the illuminating units for emitting light,
wherein each one of the illuminating units comprises:
a point-like light-emitting device. Having an optical axis;
an initial-stage conoid-like reflective surface, having a convergent opening end and a divergent opening end, wherein the point-like light-emitting device is located at the convergent opening end and the optical axis is toward the divergent end for emitting light, the initial-stage conoid-like reflective surface and the optical axis include an initial-stage included angle; and
a final-stage conoid-like reflective surface, having a convergent opening end and a divergent opening end, wherein the convergent opening end of the final-stage conoid-like reflective surface is coupled with the divergent opening end of the initial-stage conoid-like reflective surface, the final-stage conoid-like reflective surface and the optical axis include a final-stage included angle, wherein the initial-stage included angle is larger than the final-stage included angle,
wherein the initial-stage conoid-like reflective surface and the final-stage conoid-like reflective surface are respectively formed in an initial-stage material layer and a final-stage material layer.

14. The structure of illuminating light source of claim 13, wherein the conoid-like reflective surfaces comprise square pyramid surfaces or rectangular pyramid surfaces.

15. The structure of illuminating light source of claim 13, wherein the initial-stage conoid-like reflective surface and the final-stage conoid-like reflective surface are all cone surfaces.

16. The structure of illuminating light source of claim 13, further comprising at least one middle-stage conoid-like reflective surface, having a divergent opening end and a convergent opening end for coupling between the divergent opening end of the initial-stage conoid-like reflective surface and the convergent opening end of the final-stage conoid-like reflective surface, wherein the middle-stage conoid-like reflective surface and the optical axis include a middle-stage included angle, in quantity, between the initial-stage included angle and the final-stage included angle.

17. The structure of illuminating light source of claim 13, wherein a line is formed from any point on a periphery of the divergent opening end of the final-stage conoid-like reflective surface to the point-like light-emitting device, wherein the line and the optical axis form a maximum included angle or a minimum included angle, being a predetermined angle, so as to determine a size of the divergent opening end of the final-stage conoid-like reflective surface.

18. The structure of illuminating light source of claim 13, wherein the point-like light-emitting devices are light-emitting diodes.

19. The structure of illuminating light source of claim 13, wherein the divergent opening end of the initial-stage conoid-like reflective surface in a circular shape is coupled with the convergent opening end of the final-stage conoid-like reflective surface, and the final-stage conoid-like reflective surface has the convergent opening end in the circular shape and the divergent opening end in a regular quadrilateral shape to form a mixed conoid-like surface.

20. The structure of illuminating light source of claim 13, wherein the divergent opening end of the initial-stage conoid-like reflective surface in a regular quadrilateral shape is coupled with the convergent opening end of the final-stage conoid-like reflective surface, and the final-stage conoid-like reflective surface has the divergent opening end in the regular quadrilateral shape, and the initial-stage conoid-like reflective surface has the convergent opening end in a circular shape and the divergent opening end in the regular quadrilateral shape to form a mixed conoid-like surface.

21. A structure of illuminating light source, comprising:
an initial-stage material layer, having a plurality of initial-stage conoid-like reflective surfaces;
a final-stage material layer on the initial-stage material layer, the final-stage material layer having a plurality of final-stage conoid-like reflective surfaces matching with the initial-stage conoid-like reflective surfaces, to form a plurality of reflective surface units;
a plurality of electrode layers on a bottom surface of the initial-stage material layer without covering a convergent opening end of the initial-stage conoid-like reflective surfaces, wherein a beginning one of the electrode layers is connected to a first voltage and an ending one of the electrode layers is connected to a second voltage; and
a plurality of the light emitting devices, disposed over the bottom surface of the initial-stage material layer, wherein each of the light emitting devices is corresponding to one of the reflective surface units, and having two voltage terminals respectively connected to two of the electrode layers,
wherein the first voltage and the second voltage applies an operation voltage on each of the light emitting devices by the electrode layers.

22. The structure of illuminating light source of claim 21, wherein the light emitting devices form a 2-dimensional array having a row, and two of the electrode layers are connected to the row of the light emitting devices in series.

* * * * *